United States Patent [19]
Feathers et al.

[11] 4,378,795
[45] Apr. 5, 1983

[54] FLUID CONNECTOR ASSEMBLY

[75] Inventors: Leonard J. Feathers, Henfield; Peter M. Ely, Pulborough, both of England

[73] Assignee: Chubb Panorama Limited, Sussex, England

[21] Appl. No.: 253,627

[22] Filed: Apr. 13, 1981

[30] Foreign Application Priority Data
Apr. 16, 1980 [GB] United Kingdom ............... 8012581

[51] Int. Cl.$^3$ .............................................. A62B 7/00
[52] U.S. Cl. ......................... 128/202.27; 128/204.26; 128/912; 285/305
[58] Field of Search ................ 128/201.27, 201.28, 128/202.27, 204.26, 207.14, 207.15, 207.17, DIG. 26, 912; 285/305

[56] References Cited
U.S. PATENT DOCUMENTS

| 3,973,791 | 8/1976 | Porta et al. ........................ 285/305 |
| 4,076,279 | 2/1978 | Klotz et al. ........................ 285/305 |
| 4,111,197 | 9/1978 | Warncke et al. ............... 128/202.27 |

FOREIGN PATENT DOCUMENTS

| 2362527 | 6/1975 | Fed. Rep. of Germany ...... 285/305 |
| 683947 | 3/1965 | Italy ................................... 285/305 |
| 398217 | 2/1966 | Switzerland ....................... 285/305 |

*Primary Examiner*—Henry J. Recla
*Attorney, Agent, or Firm*—Pollock, Vande Sande & Priddy

[57] ABSTRACT

An assembly for connecting together fluid-conducting spigot and socket members employs a U-shaped locking clip with parallel legs sliding in chordwise passages of the socket member. The spigot member has an external groove which is engaged by the legs of the locking clip intruding into the socket when the spigot is inserted into the socket and the clip is slid into its operational position. The clip can be retained in this position by the "snap" engagement of the base portion of the U-shape with a transverse groove in the face of the socket member. The assembly is particularly useful for connecting a demand valve into the facemask of a breathing apparatus.

5 Claims, 3 Drawing Figures

FLUID CONNECTOR ASSEMBLY

The present invention relates to a connector assembly for fluid-conducting members.

In particular the invention is concerned with an assembly for use in connecting the breathing gas supply to the face mask of a breathing apparatus such as may be worn by firemen, rescue workers and others who are required to perform tasks in noxious or oxygen-depleted environments. Conventionally, such a connection is made by means of a screw-threaded element on the gas supply means which is screwed into a complementarily threaded socket on the mask until an annular end face of the element contacts a flat sealing ring housed in the base of the socket. Such screw-threaded connectors are costly to produce and the threads can become damaged in use thereby reducing the security of the connection which they afford. Also the sealing ring can become scored by the end of the supply element as it is screwed home, and leakage may occur. A further drawback of this conventional connector is that it does not permit the connected elements to swivel relative to one another in the assembled condition unless an additional mechanism, adding to the cost and complexity of the unit, is provided for this purpose. In the case of breathing apparatus it is a useful provision to have a swivel joint at the facemask whereby the wearer can turn his head freely, without pulling at the supply duct or alternatively requiring a large loop of loose ducting.

In United Kingdom Pat. No. 1,558,207, which corresponds to Warncke et al U.S. Pat. No. 4,111,197, there is proposed an alternative form of assembly for connecting a gas supply to the facemask of a breathing apparatus. This comprises, in effect, a spigot and socket coupling with a U-form spring clip whose legs pass through apertures on opposite sides of the socket so as to be capable of embracing the outer surface of the spigot when the latter is inserted into the socket. The spigot has a divergent external shoulder for urging the legs of the clip apart as the spigot is inserted into the socket, followed by a groove into which the legs resile to retain the spigot when it is fully home. To release the spigot the base of the clip is pressed radially inwards whereupon the free ends of the legs are caused to ride along inclined surfaces which bound the apertures in the socket, so that the legs are urged apart and disengage from the groove in the spigot. An operating button is provided to enable the user to press in the base of the clip, and this button, together with the clip, is retained by an additional ring surrounding the socket. While offering certain advantages over the conventional screwthreaded assembly this connector is still of fairly complex construction and would require manufacture to close tolerances to ensure reliable operation. Furthermore, the ease by which the gas supply spigot can be released by pressure on the operating button poses the threat of the gas supply becoming accidentally disconnected from the facemask should the button be knocked or inadvertently operated while the breathing apparatus is in use.

The present invention accordingly seeks to provide a connector assembly whereby some or all of the above-described drawbacks of prior art connectors can be overcome. Although intended particularly for use in relation to breathing apparatus, assemblies according to the invention may nevertheless find more general application to the connection together of fluid-conducting members.

In one aspect the invention resides in a connector assembly comprising a first fluid-conducting member defining a tubular spigot; a second fluid-conducting member defining a socket for such spigot; and a locking clip having a pair of legs received within respective passages extending chordwise through the second fluid-conducting member and intersecting said socket; the legs being arranged to be slid longitudinally through the passages between a first position in which a portion of each leg intrudes chordwise into said socket and a second position in which the legs are withdrawn from such intrusion; and said spigot being configured externally so as to be engaged by the legs of the locking clip to prevent withdrawal of the spigot from the socket when the spigot is inserted therein and the legs are then slid from said second to said first position.

Such an assembly can be very simple and economic to produce. Likewise it can be simple to operate and require little or no maintenance, while at the same time affording a secure and reliable connection between the two fluid-conducting members. More particularly the socket-defining member can be moulded in one piece from a suitable plastics material (of which nylon is an example) if desired, while the locking clip can be fashioned from a single piece of wire. The connection is secured by a simple sliding movement of the clip legs and does not depend on any spring characteristics of the legs. Neither does its connection or disconnection require camming operations to be performed on the legs by the spigot and socket elements, in contrast to the connector disclosed in United Kingdom Pat. No. 1,558,207.

Preferably, the spigot is formed with a continuous circumferential groove for engagement with the clip legs. In this way the spigot can be offered to the socket in any relative rotational position, and is permitted to swivel in the socket after the clip legs have been slid to retain the spigot.

Preferably also, the clip is of U-shape, with the base of the U providing a handle portion by which the legs can be slid manually to connect and disconnect the two fluid-conducting members. In order to lock the legs in their aforesaid first (i.e. spigot-retaining) position when the connection has been made, the second fluid-conducting member may be provided with a groove, shoulder or the like formation with which the base of the clip can engage with a 'snap' action when in this position. In this way the connection can still be secured by the simple sliding motion of the clip, but it may be arranged that a certain manipulative action, or the use of a tool, is required subsequently to disengage the clip base from the co-operating formation and thus enable the clip to be slid to disconnect the fluid-conducting members, thereby guarding against unintentional disconnection.

It is also desirable that the locking clip is at all times retained by the second fluid-conducting member, as otherwise the clip could be lost and/or replaced by another of the incorrect form. This retention could be achieved e.g. by the simple expedient of a chain or the like flexible tension member joining the two elements. In a preferred arrangement, however, the free end of each leg is turned away from the respective longitudinal axis to define a hook-like portion and the passages in the second fluid-conducting member are of such width as to accommodate these portions for sliding motion, but a pin is secured across each passage at a selected location against which the respective hook-like portion abuts to limit the distance by which the legs can be withdrawn when moved from their first to their second said positions.

In a second aspect the invention resides in breathing apparatus wherein the breathing gas supply is connected to a facemask by means of a connector assembly according to the first-defined aspect of the invention. In this aspect the first fluid-conducting member may be the outlet member of a so-called demand or lung-controlled valve forming part of the gas supply means.

The invention will now be more particularly described, by way of example, with reference to the accompanying drawings, in which.

Figure 1:
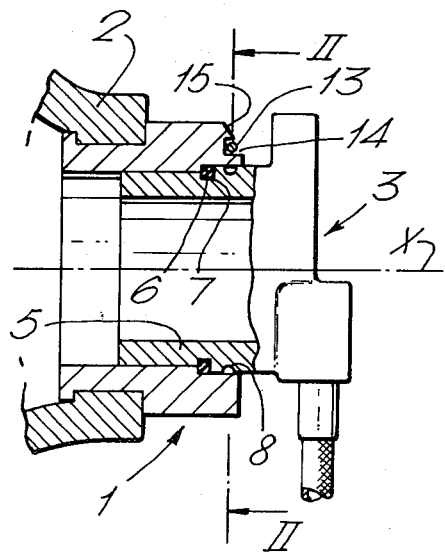
FIG. 1 is a sectional elevation of a connector assembly in accordance with the invention shown connecting a demand valve to a facemask of a breathing apparatus.

Referring to FIG. 1, a moulded plastics socket member 1 is secured in a tubed inlet 2 formed on the facemask of a breathing apparatus, and coupled to the socket is a demand valve 3. Respirable gas is supplied to the demand valve through a hose 4 and the valve passes such gas into the facemask through its tubular outlet spigot 5 in accordance with the respiratory demands of the wearer. The demand valve may be of the type disclosed in our published United Kingdom patent application No. 2,054,207. However, the mechanism of the valve by which it controls the supply of gas to the facemask in accordance with the wearer's respiratory demands forms no part of the present invention and hence will not be described in this specification. For the same reason, and for clarity of illustration, the internal details of the valve are omitted from FIG. 1.

The socket member 1 has a stepped internal diameter to define an annular shoulder 6, and the spigot 5 of the demand valve is inserted into the socket so that an O-ring seal 7 captive on the spigot abuts this shoulder. Spaced axially from the seal 7, the spigot 5 is also provided externally with a continuous circumferential groove 8 for a purpose described hereafter.

Figure 2:
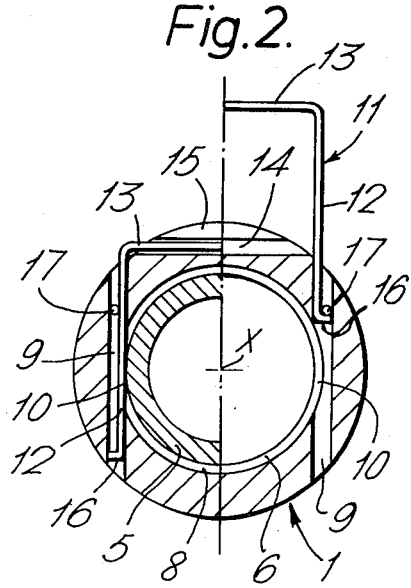
FIG. 2 is a sectional view taken on line II—II of FIG. 1, the left hand side of the figure showing the demand valve retained by the locking clip of the assembly and the right hand side of the figure showing the locking clip released and the demand valve removed.
Figure 3:
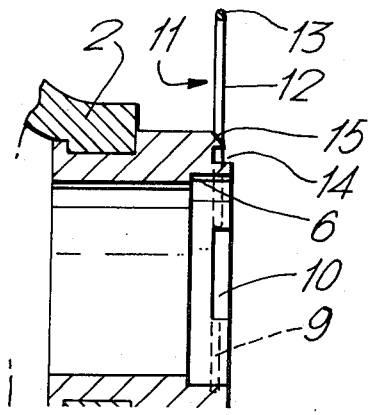
FIG. 3 is a view similar to FIG. 1 but with the locking clip released and the demand valve removed.

Referring now also to FIGS. 2 and 3 the socket member 1 is provided with a parallel pair of rectangular cross-sectioned passages 9 extending chordwise through the socket member and intersecting the interior of the socket at diametrically opposite locations 10. The assembly also comprises a locking clip 11 in the form of a length of wire bent to a U-shape, and each leg 12 of this clip is arranged to slide longitudinally through a respective passage 9. The two limiting positions of the clip relative to the socket member are indicated in FIG. 2. The left hand side of this figure shows the clip when fully pushed in to the socket member, the legs 12 intruding chordwise into the interior of the socket at the locations 10. The clip can be retained in this position by the engagement of the base 13 of the U in a groove 14 provided in the front face of the socket member at right angles to the passages 9. To engage the base 13 with the groove 14 the clip is simply slid in to the socket member, in so doing the base 13 riding over an inclined surface 15 bounding one edge of the groove and then snapping into the groove. Before the clip can be slid back to its withdrawn position, however, its base must first be manipulated or prised out of the groove 14. The withdrawn position of the clip is shown in the right hand side of FIG. 2. It will be seen that the free end of each leg 12 is turned away from the longitudinal axis of the respective leg to define a hook-like portion 16. The passages 9 are of such width as to accommodate these portions for sliding motion but a pin 17 is secured across each passage as shown in FIG. 2 against which the portions 16 abut to prevent complete withdrawal of the clip from the socket member.

In order to couple the demand valve 13 to the socket member 1 the clip 11 is first set in its withdrawn position. The spigot 5 of the valve can then be inserted into the socket until the seal 7 abuts the shoulder 6 in which position the groove 8 of the spigot lies in the same plane as the passages 9 and clip 11. The clip is then simply pushed by its base 13 inwards into the position shown in the left hand side of FIG. 2 in which, as will be appreciated, the legs 12 intruding into the socket also engage within the groove 8. In this condition the valve cannot be removed from the socket, although it can swivel in the socket about the axis X to any angular position, in any such position the legs 12 remaining in engagement with the groove 8 and the O-ring 7 maintaining a gas-tight seal between the components. The clip is locked in position by the engagement of its base 13 with the groove 14 as described above, so inadvertent withdrawal of the clip cannot take place. To uncouple the valve from the socket the base 13 of the clip is disengaged from the groove 14 and pulled outwards, withdrawing the legs 12 from intrusion into the socket and groove 8 and thereby freeing the valve for removal.

The wire from which the locking clip 11 is fashioned is selected to have a bending stiffness sufficient to avoid any tendency of the legs 12 to bow outwards between the points of support defined by the respective pins 17 and hook-like portions 16 (thereby to release the demand valve 3), if the valve or its supply hose 4 should be pulled or jerked in a direction tending to withdraw the valve from the facemask during use or testing of the apparatus.

We claim:

1. A fluid connector assembly comprising a first fluid-conducting member defining a tubular spigot; a second fluid-conducting member defining a socket for said spigot and into which said spigot fits in fluid-tight manner; the second fluid-conducting member including a pair of passages extending chordwise through said second fluid-conducting member on opposite sides of said socket with a portion of each said passsage intersecting the socket; and a generally U-shaped locking clip having a pair of legs joined by a base portion; said legs being received respectively within said passages and being arranged to be slid longitudinally through the passages between a first position in which a portion of each leg lies within the aforesaid portion of the respective said passage so as to intrude chordwise into said socket, and a second position in which the legs are withdrawn from such intrusion; said spigot being configured externally with recessed portions which are juxtaposed to the said portions of said passages when the spigot is inserted into the socket so as to receive said portions of the legs of the locking clip to prevent withdrawal of the spigot from the socket when said legs are slid from said second to said first position; and the second fluid-conducting member being further provided with a formation extending generally perpendicularly to said passages which formation presents an inclined face followed by a recess so as to be engaged by the base portion of the locking clip with a snap action when said legs are slid from their second to their first position, thereby to retain the legs in their first position.

2. An asssembly according to claim 1 wherein said spigot is formed with a continuous circumferential groove providing said recessed portions which are juxtaposed to the said portions of said passages when the spigot is inserted into the socket.

3. Breathing apparatus comprising a facemask and breathing gas supply means connected to said facemask by means of a fluid connector assembly according to claim 1, the breathing gas supply means terminating in a demand valve, said demand valve having an outlet member which constitutes said first fluid-conducting member, and the second fluid-conducting member being provided on the facemask.

4. A fluid connector assembly comprising a first fluid-conducting member defining a tubular spigot; a second fluid-conducting member defining a socket for said spigot and into which said spigot fits in fluid-tight manner; the second fluid-conducting member including a pair of passages extending chordwise through said second fluid-conducting member on opposite sides of said socket with a portion of each said passage intersecting the socket; and a locking clip providing a pair of legs received within respective said passages, the legs being arranged to be slid longitudinally through the passages between a first position in which a portion of each leg lies within the aforesaid portion of the respective said passage so as to intrude chordwise into said socket, and a second position in which the legs are withdrawn from such intrusion; said spigot being configured externally with recessed portions which are juxtaposed to the said portions of said passages when the spigot is inserted into the socket so as to receive said portions of the legs of the locking clip to prevent withdrawal of the spigot from the socket when said legs are slid from said second to said first position; the free end of each leg of the locking clip being turned away from its respective longitudinal axis, the respective passages in the second fluid-conducting member being of such width as to accommodate said turned-away portions for sliding motion; and a pin secured across each passage at a selected location against which the respective turned-away portion abuts to limit the distance by which the clip can be withdrawn when the legs are slid from their first to their second position.

5. Breathing apparatus comprising a facemask and breathing gas supply means connected to said facemask by means of a fluid connector assembly according to claim 4, the breathing gas supply means terminating in a demand valve, said demand valve having an outlet member which constitutes said first fluid-conducting member, and the second fluid-conducting member being provided on the facemask.

* * * * *